Jan. 29, 1952 C. H. SCHMITTER 2,583,671
VERTICAL SHAFT SEAL
Filed Jan. 28, 1949

Inventor
CARL H. SCHMITTER
By Miles Kenninger
Attorney

Patented Jan. 29, 1952

2,583,671

UNITED STATES PATENT OFFICE 2,583,671

VERTICAL SHAFT SEAL

Carl H. Schmitter, Milwaukee, Wis., assignor to The Falk Corporation, Milwaukee, Wis., a corporation of Wisconsin Application January 28, 1949, Serial No. 73,268

3 Claims. (Cl. 286—8)

This invention relates to improvements in vertical shaft seals and particularly to seals which are to be employed in the processing of materials in which all lubricant contamination of the processed materials must be avoided.

In processing beverages, foods, etc., it is frequently necessary to mix or stir the compositions by power. An electric motor driving the stirring or mixing blades is usually mounted directly over the tank or vat and operates through speed-reducing gearing with a final drive shaft extending vertically downwardly from the gear housing. Any lubricant leakage would, accordingly, drain directly into the materials being processed.

It is, therefore, an object of the present invention to provide a vertical shaft seal which will avoid all possibility of leakage of lubricant along the vertical shaft.

Another object of the invention is to provide a vertical shaft seal with a trap and drain for lubricant leaking past the seal, the drain serving the additional function of indicating when replacement of the seal may be necessary.

Figure 1:
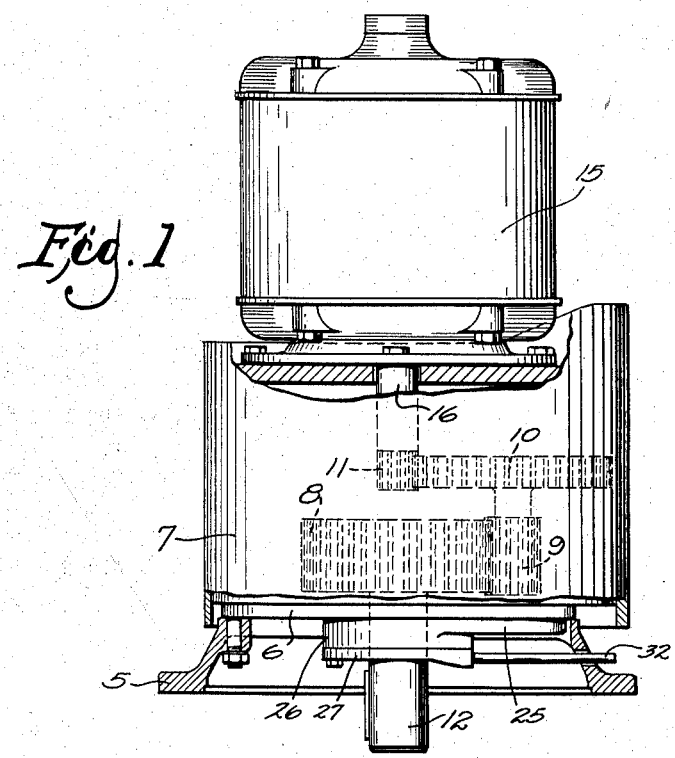
Figure 2:
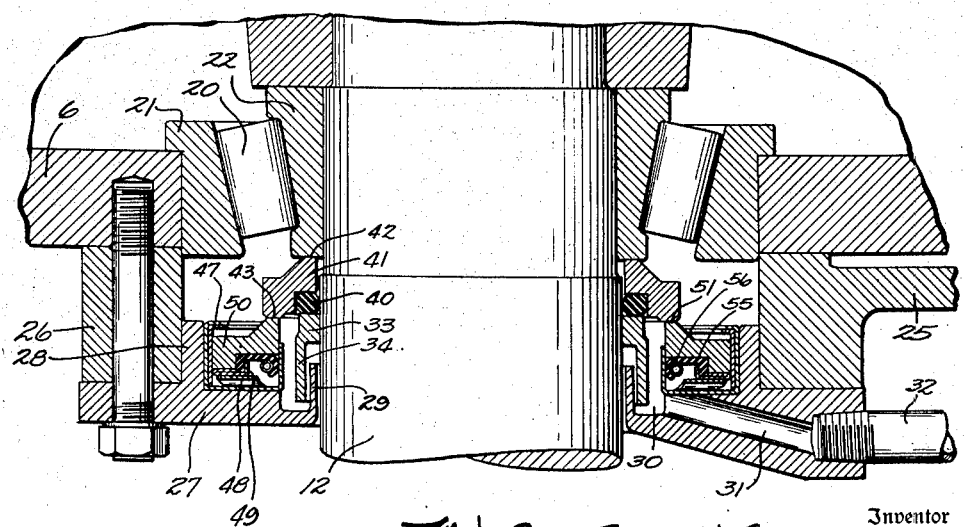

Objects and advantages other than those above set forth will be apparent from the following description when read in connection with the accompanying drawing in which:

Fig. 1 is an elevational view of a motor driving gearing with the output shaft thereof extending vertically, as one application of the seal of the present invention; and Fig. 2 is a fragment of a vertical shaft and of a housing from which the shaft extends, with the present seal in vertical cross-section.

Referring to the drawings in which like numerals designate like parts, 5 designates a ring which is to be mounted on a mixing tank or vat for connection with the bottom 6 of a housing 7, the housing enclosing gearing indicated at 8, 9, 10 and 11 with an output shaft 12 extending from the housing. The housing 7 supports an electric motor 15 with a shaft 16 extending into the gearing housing, the motor shaft bearing the gear 11'. The gearing output shaft 12 is mounted in a roller bearing 20 (see Fig. 2) set into an aperture in the housing bottom 6 and including a raceway 21 resting on the housing bottom and a raceway 22 seated on the shaft and supporting the shaft both laterally and vertically.

A plate 25 with a substantially annular portion 26 is fixed on the housing bottom about the aperture therethrough to form the side wall of a seal inclosing chamber and an end plate 27 coacts with the side wall plate in defining such chamber. End plate 27 has a flange 28 fitting inside the seal chamber side wall 26 and a flange 29 defining an aperture centrally of the seal chamber and through which the shaft 12 extends. Adjacent the chamber end plate flange 29, a groove 30 is cut into the end plate 27 to form a receptacle for leakage lubricant and the groove is connected by a passage 31 with a tube 32 for draining lubricant leakage out of the sealing chamber to a place of disposal. A ring 33 is mounted on the shaft 12 and has a flange 34 defining a space along the shaft to receive the flange 29 of the seal chamber end plate 27 and to coact therewith in providing a labyrinth type of seal for the seal chamber.

A toroidal ring 40 of resilient and lubricant-resistant material is seated on ring 33 and is held in the rabbeted edge of a ring 41 having one surface 42 in contact with an end of the bearing raceway 22. The ring 41 turns with the shaft because of the resilience of the ring 40 which presses the ring surface 42 against the end of the bearing raceway 22. Ring 41 acts as an umbrella to flow lubricant away from the shaft when the seal is used in a low speed installation. In high speed installations, ring 41 throws lubricant away from the shaft. Thus in either low or high speed use, ring 41 aids in keeping lubricant out of the space between ring 41 and the shaft. The construction described immediately above, accordingly, provides a plurality of rings mounted on the shaft and coacting to provide a plurality of pairs of non-relatively movable sealing surfaces. Any leakage between the ring surface 42 and the end of the bearing raceway 22 is trapped by ring 40 and ring 33. The three rings above mentioned, accordingly, provide a plurality of sealing surfaces acting in series to prevent any leakage of lubricant along the shaft.

A further seal is provided between a surface 43 of ring 41 and the seal chamber end plate 27, such seal comprising a casing 47 in which is mounted an undulating leaf spring 48. A washer 49 rests on the leaf spring and receives a sealing ring 50 having a sealing surface 51 contacting with the surface 43 of ring 41. The ring 50 is retained in the casing 47 and on the washer 49 by a substantially ring-like structure 55 of resilient lubricant-resisting material which is held in the casing 47 by a helical garter spring 56. The above further seal provides a ring pressed into contact with one of the shaft rings and co-acting therewith to provide a pair of relatively movable sealing surfaces which act in parallel with the non-relatively movable surfaces to retain lubricant within the housing 7.

It will thus be seen that the present construction provides a vertical shaft seal with a plurality of independent pairs of sealing surfaces of which only one pair of surfaces are relatively movable. Leakage passing between one pair of the non-relatively moving surfaces is trapped by a simple structure providing a second pair of non-relatively movable surfaces, both such pairs of surfaces being directly associated with the shaft. Leakage passing between the single pair of relatively movable surfaces collects in a trap which is sealed by a labyrinth type seal adjacent the shaft and leakage into the trap is drained out of the sealing chamber. It is hence impossible for lubricant to leak along the shaft or to leak from the sealing chamber itself. When the seal is used in a relatively high speed installation, the ring forming a portion of the labyrinth seal also acts as an "oil slinger" to avoid creepage of oil through the labyrinth and to aid in passing oil out of the trap.

Although but one embodiment of the present invention has been illustrated and described, it will be apparent that various changes and modifications may be made therein without departing from the invention as defined in the appended claims.

I claim:

1. In a lubricant seal for a vertical shaft, a plate having a flange extending in spaced relation about the shaft, a member on the shaft and having a face extending at substantially right angles to the shaft axis, a ring seated against the member face in non-rotatable relation, a resilient ring engaging the shaft and holding the first said ring in position, a ring fixed on the shaft and pressing on the resilient ring and having a flange in spaced relation with and coacting with the plate flange in forming a labyrinth seal, and a ring resiliently mounted on the plate and bearing on the first said ring for relative movement therebetween, the labyrinth sealing flanges and the relatively movable rings defining a space for receiving lubricant leakage along the shaft and between the relatively movable rings.

2. In a lubricant seal for a shaft extending vertically downwardly from a casing, a plate coacting with the casing in defining a chamber about the shaft, the plate having a flange extending upwardly in spaced relation about the shaft, a member on the shaft and having a face extending at substantially right angles to the shaft axis, a ring in spaced relation about the shaft and seated against the member face in non-rotatable relation, a resilient ring gripping the shaft under compression and holding the first said ring in position, a ring fixed on the shaft and pressing on the resilient ring and having a downwardly extending flange in spaced relation about and coacting with the plate flange in forming a labyrinth seal, and a ring resiliently mounted on the plate and bearing on the underside of the first said ring for relative movement therebetween, the labyrinth sealing flanges and the relatively movable rings defining a space for receiving lubricant leakage between the seated and relatively movable surfaces.

3. In a lubricant seal for a vertical shaft, a plate having a flange extending in spaced relation about the shaft, a member on the shaft and having a face extending substantially at right angles to the shaft, a ring having a surface seated against the member face in non-rotatable relation, the ring having a rabbet opposite the seating surface thereof, a resilient ring compressed about the shaft in the rabbet of the first said ring and holding the first said ring in seated position, a ring fixed on the shaft and pressing on the resilient ring, the last-mentioned ring being of a size smaller than the rabbet in the first said ring, the last mentioned ring having a flange in telescopic spaced relation with and coacting with the plate flange in forming a labyrinth seal, a ring resiliently mounted on the plate and bearing on the first said ring for relative movement therebetween, the labyrinth sealing flanges and the relatively movable rings defining a space for receiving lubricant leakage along the shaft, and a drain connected with the space for removal of the lubricant leakage therefrom.

CARL H. SCHMITTER,

REFERENCES CITED

The following references are of record in the file of this patent:

UNITED STATES PATENTS

| Number | Name | Date |
| --- | --- | --- |
| 2,328,328 | Curtis | Aug. 31, 1943 |
| 2,432,694 | Snyder | Dec. 16, 1947 |
| 2,479,968 | Schick | Aug. 23, 1949 |